United States Patent [19]

Komatsu

[11] Patent Number: 4,975,719

[45] Date of Patent: Dec. 4, 1990

[54] MULTI-STYLUS RECORDING HEAD MANUFACTURING METHOD AND APPARATUS

[75] Inventor: Fumito Komatsu, Nagano, Japan

[73] Assignee: Kabushiki Kaisha Sankyo Seiki Seisakusho, Nagano, Japan

[21] Appl. No.: 493,054

[22] Filed: Mar. 13, 1990

[30] Foreign Application Priority Data

Mar. 14, 1989 [JP] Japan .................................. 1-61480

[51] Int. Cl.[5] ...................... G01D 15/06; G01D 15/10

[52] U.S. Cl. ................................ 346/155; 346/76 PH

[58] Field of Search .......................... 346/155, 76 PH

[56] References Cited

U.S. PATENT DOCUMENTS

| | | | |
|---|---|---|---|
| 4,534,814 | 8/1985 | Volpe et al. | 346/76 PH X |
| 4,691,213 | 9/1987 | Inaba et al. | 346/159 |
| 4,920,363 | 4/1990 | Hack | 346/155 |

FOREIGN PATENT DOCUMENTS

| | | | |
|---|---|---|---|
| 54-139538 | 10/1979 | Japan | 346/155 |
| 56-25390 | 11/1981 | Japan . | |

*Primary Examiner*—George H. Miller, Jr.

*Attorney, Agent, or Firm*—Sughrue, Mion, Zinn, Macpeak & Seas

[57] ABSTRACT

In manufacturing a multi-stylus recording head in the head surface of which the ends of MxN recording electrodes are exposed (N groups each having M electrode wires), a wire aligning drum having MxN wire positioning grooves, wire directing section and M wire bundling sections and a wire guide are moved relative to each other, to guide one electrode wire to the wire bundling sections, wire directing section and wire positioning grooves continuously, so that, of the M wires of each of the N groups, N wires being in a predetermined positional relation to one another are bundled at the M wire bundling sections, and the MxN wire are positively engaged with the wire positioning grooves.

5 Claims, 11 Drawing Sheets

MULTI-STYLUS RECORDING HEAD MANUFACTURING METHOD AND APPARATUS

BACKGROUND OF THE INVENTION

This invention relates to a method of manufacturing a multi-stylus recording head suitable for an electrostatic recording device of wide range scan type, and an apparatus for practicing the method.

A multi-stylus recording head of an electrostatic recording device comprises: a recording electrode array including recording electrodes arranged at extremely small intervals, or such a recording electrode array and a control electrode array arranged along the recording electrode array. In order to simplify a drive circuit for the recording electrodes, the recording electrode array is divided in a plurality of blocks, which are connected to drive circuits. Generally, in the multi-stylus recording head having M x N recording electrodes, the recording electrodes are divided into N groups (blocks) each having M recording electrodes. The terms "M" and "N" are used in place of numerical values. One recording electrode is selected from each group of recording electrodes, and the N recording electrodes thus selected are bundled, so that M bundles of recording electrodes are formed. The M bundles of recording electrodes thus formed are connected to a wiring terminal board.

In one example of a conventional method of manufacturing a multi-stylus recording head, spiral grooves are formed in the cylindrical surface of a drum, a wire providing recording electrodes (hereinafter referred to merely as "a wire" or "an electrode wire", when applicable) is wound in the grooves a predetermined number of turns, the wires thus wound are fixed along the generating line of the drum and then suitably cut to provide a head surface. The assembly of the wires thus cut is removed from the drum and control electrode arrays are arranged on both sides thereof, to form a head element. The electrode wires forming the recording electrode array are connected to a wiring terminal board as follows: One wire is selected from each group of wires in such a manner that the wires thus selected are equal in positional relation to one another. The wires thus selected are bundled to form a bundle of wires. The bundles of wires thus formed are connected to the wiring terminal board In the method, one electrode wire is wound on the drum in such a manner that the wires thus wound are aligned with one another. Therefore, the method is advantageous in that the wire aligning speed (or wire supplying speed) is high. However, the method suffers from difficulties that, since the wires selected from the groups of wires one per group are manually bundled, the wire bundling operation is low in work efficiency, and the wires may be broken or may be connected incorrectly, and therefore the resultant product is low in reliability.

In order to improve the work efficiency and the reliability, a method has been proposed, for instance, by Japanese Patent Application Publication No. 25390/1981. In the method, a number of electrodes wires which are equal in positional relation to one another in the groups of wires are held mechanically uniformly tensioned, and are then bonded together with adhesive tape. Both end portions of the wires, after being cut, are bundled and temporarily connected to V-shaped grooves of a printed circuit board. The above-described operations are repeatedly carried out as many times as the number of the groups. In the method, the electrode wires are bundled every groups, which eliminates the above-described difficulties that the wire are connected erroneously, and the resultant product is low in reliability.

However, the method is also disadvantageous in the following points: It needs a number of manufacturing means such as means for supplying a number of electrode wires, means for tensioning these wires uniformly, means for cutting the wires at both ends, and accordingly, an apparatus for practicing the method is unavoidably intricate in construction and bulky in size. Furthermore, it will take lots of time and labor to supply a number of thin copper electrode wires and to align them. Therefore, the method still suffer from problems to be solved technically.

SUMMARY OF THE INVENTION

Accordingly, an object of this invention is to eliminate the above-described difficulties accompanying a conventional multi- stylus recording head manufacturing method.

More specifically, an object of this invention is to provide a method of manufacturing a multi-stylus recording head in which a multi-stylus recording head can be manufactured with high work efficiency and the recording head thus manufactured is high in reliability, and an apparatus for practicing the method.

The foregoing object and other objects of the invention have been achieved typically as follows: In manufacturing a multi- stylus recording head in the head surface of which the ends of MxN recording electrodes are exposed where N is the number of groups of the recording electrodes, and M is the number of the recording electrodes which are arranged with a predetermined pitch in each of the N groups, according to the invention, a multi-stylus recording head manufacturing apparatus is used which comprises: a wire aligning member including MxN first positioning grooves extended in a predetermined direction for engaging with an electrode wire, MxN second positioning grooves formed in correspondence to the first positioning grooves with the same pitch for engaging with the electrode wire, a first wire directing section for directing the wire which is to be engaged with the first positioning grooves, a second wire directing section for directing the wire which is to be engaged with the second positioning grooves, M first wire bundling sections for bundling, of the wires of the N groups engaged with the first positioning grooves, N wires at predetermined positions in the N groups, and M second wire bundling section for bundling, of the wires of the N groups engaged with the second positioning grooves, N wires which are the same in positional relation as those in the first wire bundling sections; and wire supplying means for supplying the wire to the wire aligning member, to lay the wire pulled out of the wire supplying means to align MxN wire according to the following manufacturing steps: (a) the wire is engaged with the m-th of the first wire bundling sections (m=1, 2,......) and then with the first directing section corresponding to the n-th of the N groups (n=1, 2,.... , (b) in the n-th group having M grooves, the wire is engaged with the first and second positioning grooves which are in predetermined positional relation to the m-th wire bundling section, (c) the wire is engaged with the second directing section corresponding to the n-th group, the m-th of the second wire bundling sections, and then the second directing section corresponding to the n'-th of the N groups which is different from the n-th; (d) in the n'-th group having M grooves, the wire is engaged with the first and second positioning grooves which are in predetermined positional relation to the m-th wire bundling section, (e) the wire is engaged with the first directing section corresponding to the n'-th of the N groups, and then the m-th of the first wire bundling sections, and (f) manufacturing steps (a) through (e) are repeatedly carried out, or the manufacturing steps are repeatedly carried out with the wire engaged with the m'-th wire bundling section different from the m-th wire bundling section, so that one wire is engaged with each of the first and second positioning grooves, and N wires are bundled at each of the M first wire bundling sections and M second wire bundling sections.

The nature, principle and utility of the invention will become more apparent from the following detailed description and the appended claims when read in conjunction with the accompanying drawings, in which like parts are designated by like reference numerals or characters.

DETAILED DESCRIPTION OF THE INVENTION

The present invention will be hereinafter described in detail with reference to the accompanying drawings.

Figure 1:
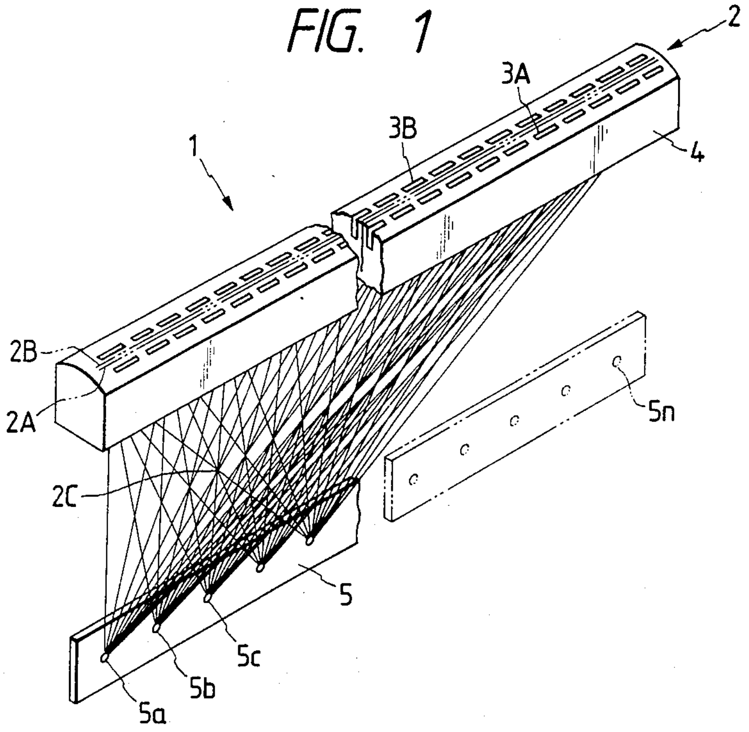
FIG. 1 is sectional perspective view showing essential components of a multi-stylus recording head which is manufactured according to a multi-stylus recording head manufacturing method of this invention.
Figure 14:
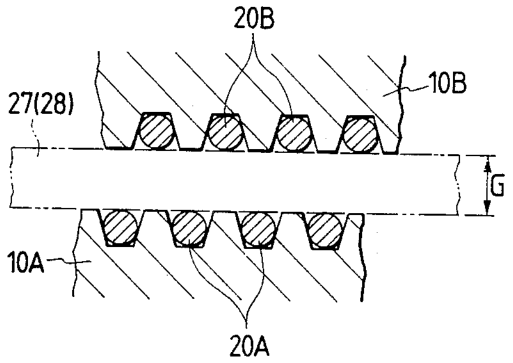
FIG. 14 is an enlarged sectional view showing a first recording electrode array and a second recording electrode array which are spaced a predetermined distance from each other and are shifted from each other by a predetermined pitch.

In FIG. 1, reference numeral 1 designates an essential part of a multi-stylus recording head manufactured with a multi-stylus recording head manufacturing apparatus according to the invention. The multi-stylus recording head 1 comprises: a recording electrode array 2 including a first recording electrode array 2A consisting of MxN recording electrodes and a second recording electrode array 2B consisting of MxN recording electrodes which is spaced a predetermined distance G from the first recording electrode array 2A as shown in FIG. 14; and control electrode arrays 3A and 3B arranged outside the first and second recording electrode arrays 2A and 2B. The ends of those electrodes are exposed. The electrode arrays are fixedly arranged in an electrode support 4 made of insulating synthetic resin. Lead wires 2C connected to the electrodes of the recording electrode arrays 2A and 2B are divided into bundles each consisting of a predetermined number of lead wires (described later), and the bundles are connected to predetermined terminals *5a*, *5b*, *5c*...and *5n* of a wiring terminal board 5. The control electrode arrays 3A and 3B are also connected to terminals (not shown). The electrode support 4 and the wiring terminal board 5 are supported, as one unit, by a head supporting member (not shown).

The manufacturing apparatus according to the invention, which is suitable for manufacturing the multi-stylus recording head 1 shown in FIG. 1, will be described with reference to FIG. 2.

Figure 2:
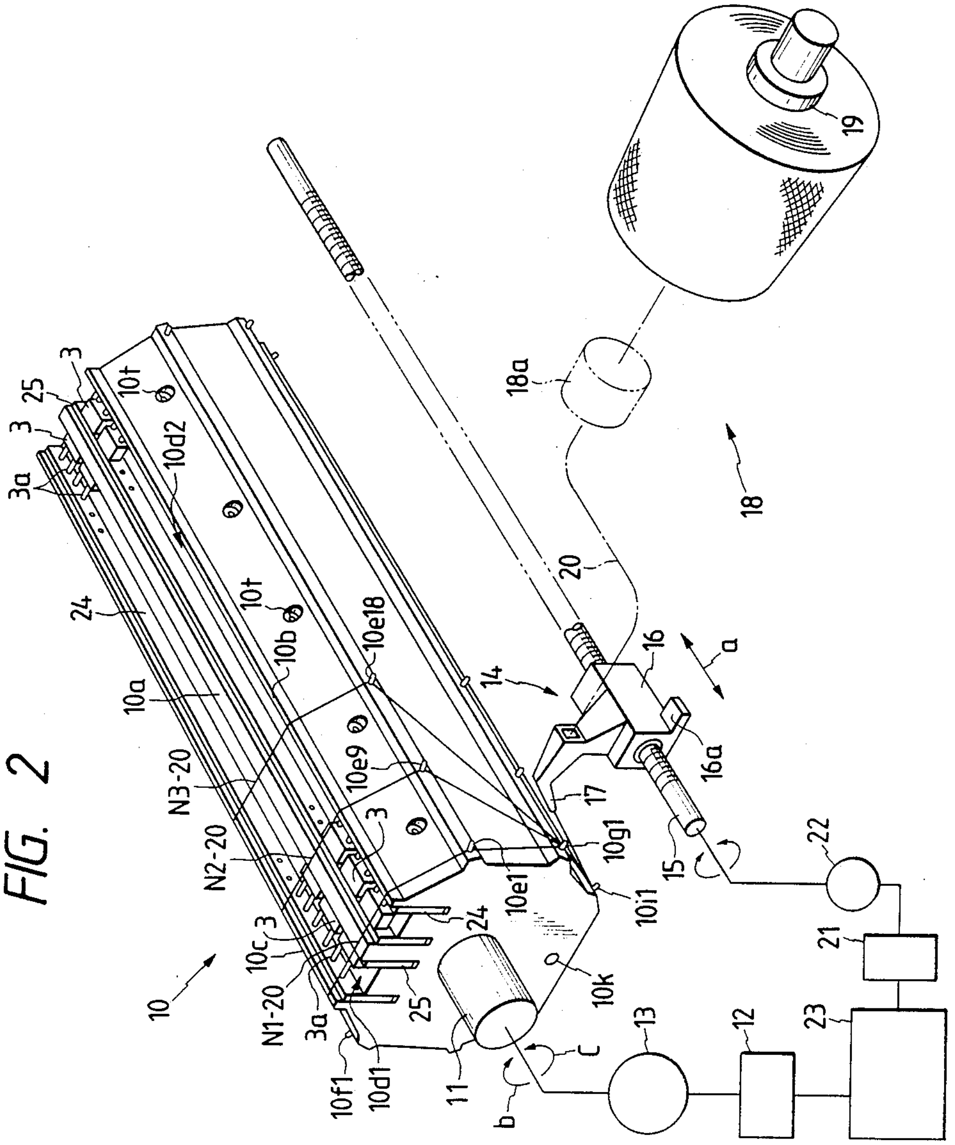
FIG. 2 is an exploded view (partly as a block diagram) showing essential components of an apparatus for practicing the manufacturing method according to the invention.

In FIG. 2, reference numeral 10 designates a wire aligning drum 10 (hereinafter referred to merely as "a drum 10", when applicable). The drum 10 is rotatably supported by a supporting shaft 11 the position of which is regulated in axial direction and in rotational direction with high precision. The supporting shaft 11 is rotated in one direction or in the opposite direction by drum driving means which includes a motor drive circuit 12 and a pulse motor 13. The structure of the drum 10 will be described in detail later. Wire guide means 14 is provided near the drum 10. The wire guide means 14 comprises: a rotatable threaded shaft 15 arranged in parallel with the supporting shaft 11 of the drum 10; and a nozzle 17 integral with a block 16 which is threadably mounted on the threaded shaft 15 so that it is movable back and forth. The block 16 has a protrusion *16a* which is engaged with a guide member (not shown) so that the block 16 is held in a predetermined posture while being spaced a predetermined distance from the drum 10. An electrode wire 20 (hereinafter referred to merely as "a wire 20", when applicable) pulled out of a bobbin 19 in wire supplying means 18, and inserted into the nozzle 17. The wire 20 wound on the bobbin 19 is a copper wire covered with insulating film, and it is pulled out of the bobbin 19 with a suitable unwinding mechanism 18*a*. A back- tension mechanism (not shown) is provided in the wire passageway between the unwinding mechanism 18*a* and the nozzle 17, to stretch the wire tight when the block 16 is reciprocated in the directions indicated by an arrow a, and to suitably tension the wire which is being wound on the drum 10. The threaded shaft 15 is rotated in one direction or in the opposite direction by a pulse motor 22 the direction of rotation and the number of revolutions of which are controlled by a motor drive circuit 21. The threaded shaft 15, the motor drive circuit 21, and the pulse motor 22 form wire guide drive means. The forward and reverse rotations of the drum 10 and the reciprocation of the wire guide mean 14 are synchronized with each other by control signals outputted by a control means 23 including a microcomputer. That is, the control means 23 receives a signal from means for detecting a rotational angle of the drum 10, and a signal from means for detecting a position of the block 16, to control the position of the nozzle 17 in association with rotation of the drum 10.

The structure of the drum 10 will be described with reference to FIGS. 2 through 8. The drum 10 is so designed as to form two head elements As best shown in FIG. 4, the drum 10 is octagonal in section. The drum 10 comprises: a center groove forming portion 10*a* extended along the axis; first and second groove forming portions 10*b* and 10*c* extended in parallel with the center groove forming portion 10*a*; electrode holding recesses 10*d*1 and 10*d*2 formed between those groove forming portions 10*a*, 10*b* and 10*c*; wire directing means, namely, first and second directing pins 10*e* and 10*f* for directing a wire which are arranged on drum ridge lines which are confronted with the center groove forming portion through the first and second groove forming portions 10*b* and 10*c*, respectively; wire bundling means, namely, first bundling pins 10*g* and 10*i* and second bundling pins 10*h* and 10*i* which are arranged on drum ridge lines which are confronted with the first and second groove forming portions 10*b* and 10*c* through the directing pins 10*e* and 10*f*, respectively; and threaded holes 10*k* used for fixing two drums to each other in a space setting step (described latter).

Figure 3:
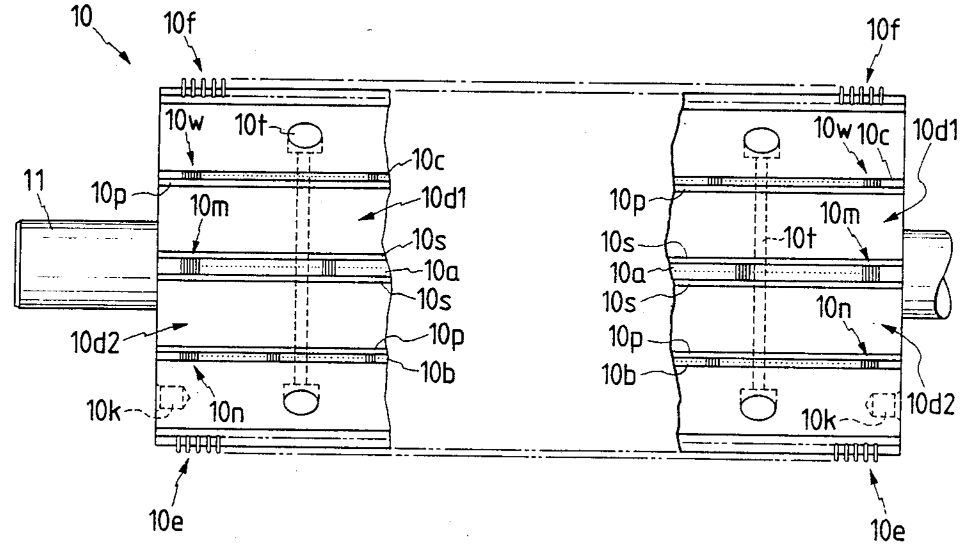
FIGS. 3 and 4 are a plan view and a side view showing one example of a wire aligning drum in the apparatus, respectively.
Figure 4:
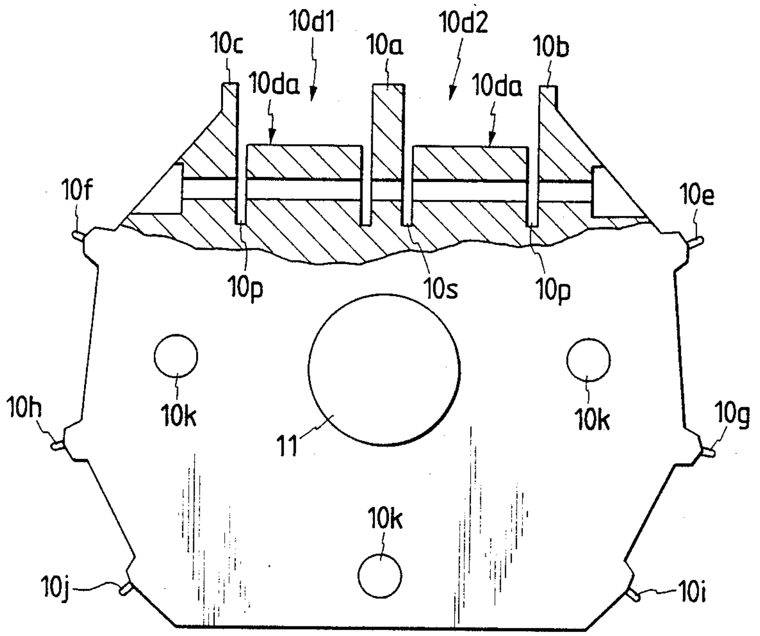
Figure 5:
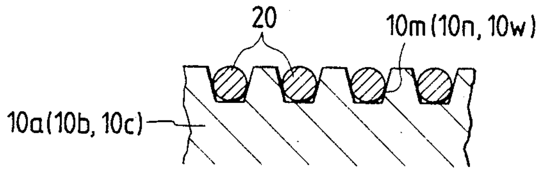
FIG. 5 is an enlarged sectional view showing wire positioning grooves (side grooves)
Figure 6:
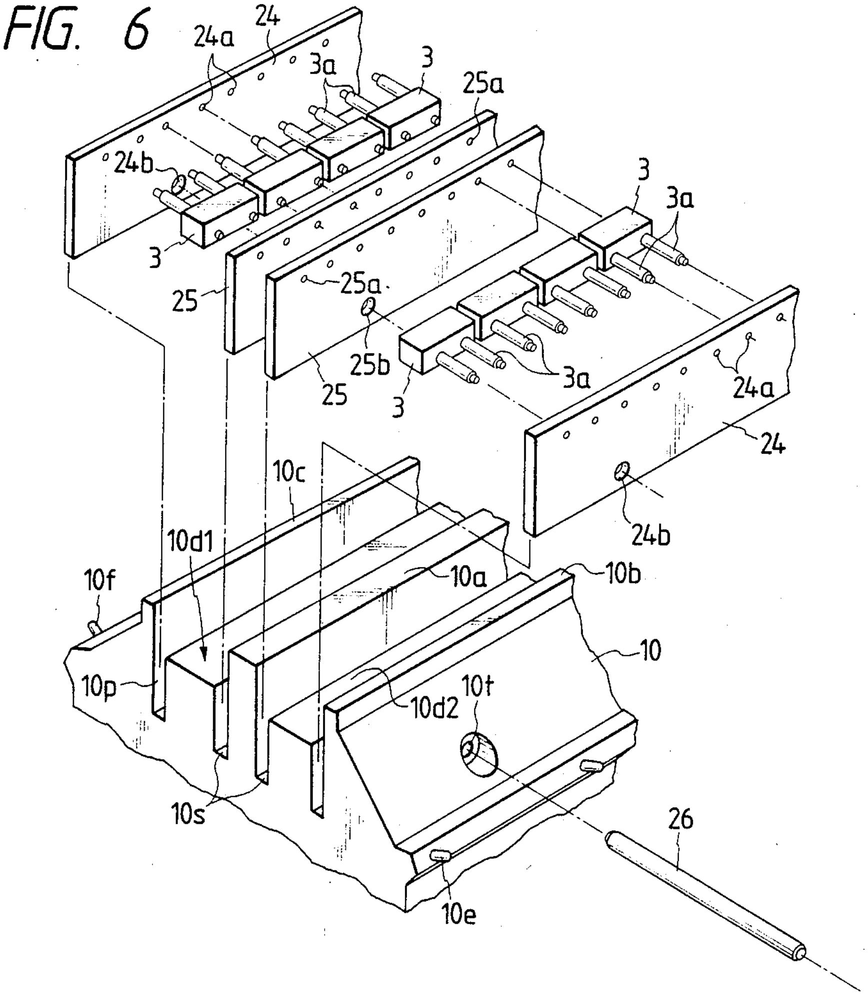
FIG. 6 is an exploded view showing essential parts of the wire aligning drum, and a control electrode holding mechanism mounted on the drum.

As shown in FIG. 3, the center positioning grooves 10*m* are formed in the outside of the center groove forming portion 10*a* in such a manner that they are extended perpendicular to the axis of the drum and they are divided N groups each having M center positioning grooves). In this embodiment, 256×28 (M=256, and N=28) center positioning grooves are formed. As shown in FIG. 5, the positioning grooves 10*m* are arranged with a pitch substantially equal to the diameter of the wire 10 and have a depth substantially equal to the diameter of the wire 10, so that they are engaged with parts of the wire wound on the drum. First MxN positioning grooves 10*n*, and second MxN positioning groove 10*w* are formed in the first and second groove forming portions, which are ridge lines of the drum, in such a manner that they are extended perpendicular to the axis of the drum and they are arranged with the same pitch and the same depth as the center positioning grooves 10*m*. The groove-formed surface of the center groove forming portion 10*a* is flush with the groove-formed surfaces of the first and second groove forming portions 10*b* and 10*c*, or the former is slightly above the latter. The edges of the center positioning grooves 10*m* and the first and second positioning grooves 10*n* and 10*w* are chamfered in order to prevent the breakage of the wire engaged with the grooves. The center positioning grooves 10*m*, and the first and second positioning grooves 10*n* and 10*w* are used for laying MxN wires in parallel with one another thereon.

M (=256) number of the first directing pins 10*e* and M number of the second directing pins 10*f* are fixedly embedded in the ridges of the drum, and N (=28) wires are laid over each directing pin. Those pins are used for directing the wires engaged with the first and second positioning grooves 10*n* and 10*w*. In the above-described embodiment, the pins are used for directing the wire. However, the method may be replaced by the following method: M(=256) grooves sufficiently deep are formed in the ridges at the same positions as the pins are located, to guide the wires.

Similarly, the first wire bundling pins 10*g* and 10*i* and the second wire bundling pins 10*h* and 10*j* are fixedly embedded in the ridges, respectively, at M (=256) positions per ridge. As is shown in an unfolded diagram of FIG. 9, the first wire bundling pins 10*g* and 10*i* are in pair and are so designed that N (=28) wires are laid over each pair of pins. Each of the first wire bundling pins 10*i* has the following functions: It receives N wires and bundle them, and guides the wire 20 to the next pin. In order to distinguish the pins 10*i* from the pins 10*g*, the pins 10*i* will be referred to as "first turn pins". The first wire bundling pins 10*g* are used to guide the wires 20 which are divided into groups each having N wires and arranged in the first positioning grooves 10*n* divided into N groups, respectively. The second wire bundling pins 10*h* and 10*j* are completely equal in function to the above- described pins 10*g* and 10*i*. For the same reason, the pins 10*j* will be referred to as "second turn pins" hereinafter. The above-described embodiment employs the first and second wire bundling pins which are used in pair; however, the same function can be obtained with the wire bundling pins 10*g* and 10*h* only; that is, the wire bundling pins 10*i* and 10*j* may be eliminated.

The drum surfaces where the pins 10*e*, 10*f*, 10*g*, 10*h*, 10*i* and 10*j* are embedded, and the ridges of the first and second groove forming portions are equidistant from the axis of rotation of the drum 10. The drum surfaces between the first and second groove forming portions 10*b* and 10*c* and the ridges where the pins are embedded are curved inwardly, so as to prevent the wires being tangled in the wire aligning operation.

As shown in FIGS. 3, 4, 6 and 8, the electrode holding recesses 10*d*1 and 10*d*2 are groove-shaped recesses extended in the direction of an axis of the drum. Plate fitting grooves 10*p* and 10*s* are formed in the bottom of each of the electrode holding recesses. The lower end portions of electrode holding plates 24 and 25 are fitted in the plate fitting grooves 10*p* and 10*s*, respectively. More specifically, the fitting grooves 10*p* are formed along the first and second groove forming portions 10*b* and 10*c*, and the fitting grooves 10*s* are formed along both sides of the center groove forming portion 10*a*. The electrode holding plates 24 and 25 hold control electrodes 3, 3,.... which are juxtaposed in the recording head, and have a length substantially equal to the length of the drum which is determined according to the length of the recording head. The upper end portions of the plates 24 and 25 have supporting holes 24*a* and 25*a*, respectively, with which the right and left end portions of supporting pins 3*a* penetrating the control electrodes are detachably engaged. The control electrodes 3 are arranged in correspondence to a predetermined number of stylus electrodes. More specifically, the pins 3*a* are electrically conductive supporting pins which serve as part of the lead wires of the electrodes, and are inserted into the control electrodes in such a manner that the control electrodes 3 are set closer to the holding plates 25 than to the holding plates 24.

Figure 7:
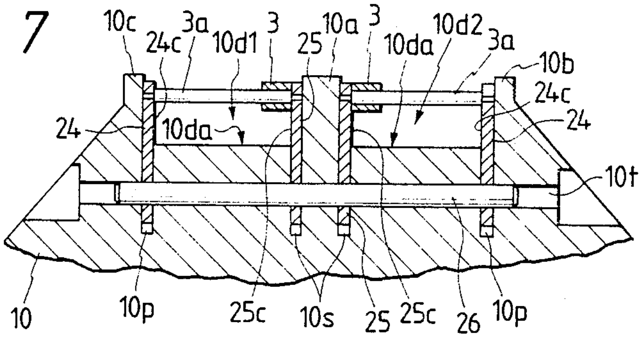
FIGS. 7 and 8 are a sectional view and a plan view showing essential parts of the wire aligning drum on which control electrodes have been mounted, respectively.

As shown in FIG. 7, the electrode holding plates 24 and 25 holding the control electrodes 3 are engaged with the plate fitting grooves 10*p* and 10*s* of the recesses 10*d*1 and 10*d*2. Then, the electrode holding plates 24 and 25 are fixedly positioned on the drum body by inserting plate positioning pins 26 into supporting holes 10*t* formed in the drum body and positioning holes 24*b* and 25*b* formed in the plates 24 and 25. As shown in FIG. 7, the outer surfaces of the control electrodes 3 thus mounted on the drum is lower than the center groove forming portion 10*a*, more specifically, than the bottoms of the center positioning grooves 10*m*, so that they are spaced a predetermined distance from the recording electrode array. The plate positioning pins 26 are fixedly inserted into the drum in such manner that they will not come off even when the drum is rotated. The electrode holding recesses 10*d*1 and 10*d*2 with the control electrodes 3 set form a part of an electrode casting mold which is formed by the bottoms 10*da* of the recesses and the confronting surfaces 24*c* and 25*c* of the holding plates 24 and 25 (cf. FIG. 13). The mold shown is completed using a pair of drums 10 and 10, and a fixing board (not shown) which closes the right and left ends of the drums and has a resin inlet through which insulating resin is poured thereinto.

A method of manufacturing a multi-stylus recording head with the manufacturing apparatus thus constructed will be described in the order of manufacturing steps.

(Control electrode mounting step)

Figure 8:
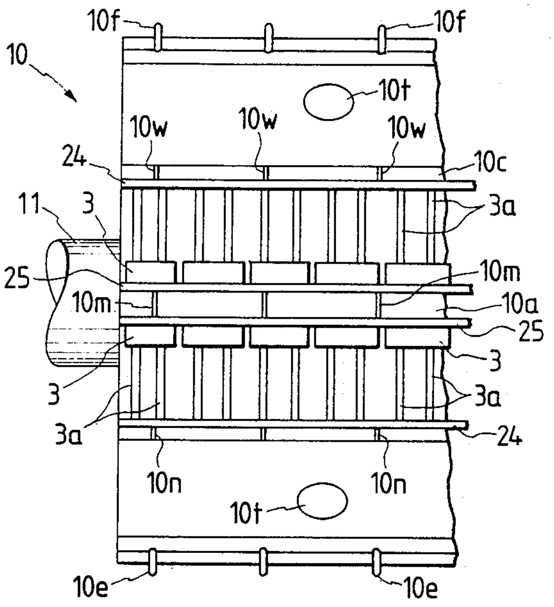

Before the wire is wound on the drum 10, the control electrodes 3 are mounted in the electrode holding recesses 10*d*1 and 10*d*2 of the drum 10 as shown in FIGS. 7 and 8. More specifically, the control electrodes 3 are set therein in such a manner that the ends of the control electrodes abut against the center groove forming portion 10*a*. In this operation, a parting agent is applied to the electrode holding plates 24 and 25 and the recess bottoms 10*da*.

(Wire aligning step)

First, the direction of rotation of the drum 10, and the direction of movement of the block 16 with the nozzle 17 will be defined for a description of this step. In FIG. 2, the direction of rotation b of the drum 10 is a forward direction, and the direction of rotation c is a reverse direction. Further in FIG. 2, the movement of the block 16 to the right (downwardly in FIG. 9) is a "go" movement, and the movement to the left (upwardly in FIG. 9) is a "return" movement The drum 10 and the nozzle 17 for guiding the wire are moved relative to each other, and therefore in FIG. 9, which is an unfold diagram of the drum, the rotation of the drum will be described by using the movement of the wire 20.

Figure 9:
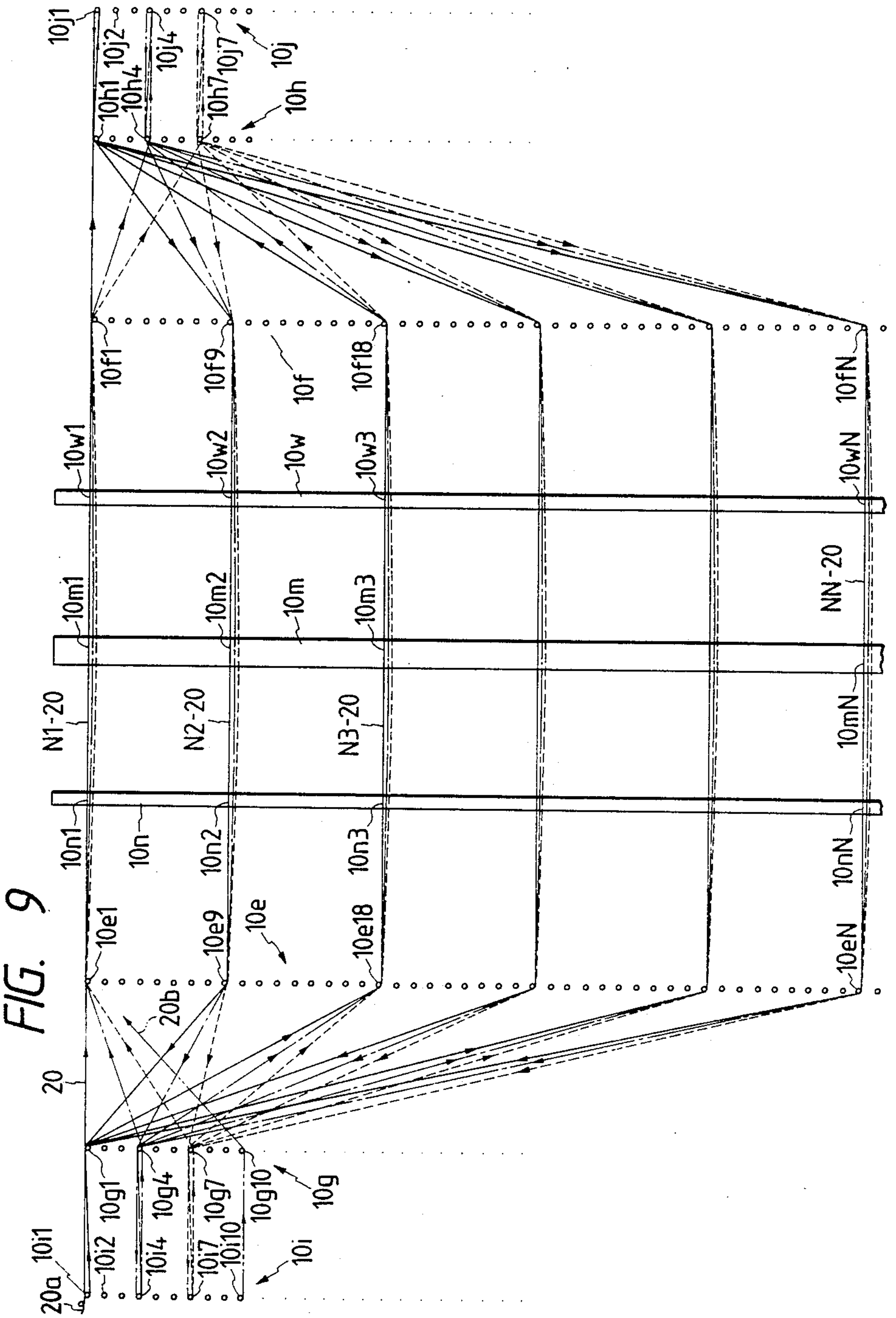
FIG. 9 is an unfolded diagram showing the wire aligning drum on which electrode wires are laid.

In FIGS. 2 and 9, the wire 20 pulled out of the bobbin 19 is inserted into the nozzle 17 which is held at the start position, and it is fixed by locking its end 20*a* to the first pin 10*i*1 of the first turn pins 10*i*. In the embodiment, the wire end 20*a* is locked to the first turn pin 10*i*1; however, the invention is not limited thereto or thereby; for instance, it may be locked to any one of the turn pins, and also, it may be locked by fixing means specifically provided Thereafter, in response to a control signal from the control means 23, the pulse motor 23 is driven to rotate the drum 10 in the forward direction b. On the other hand, in response to a control signal from the control means 23, the threaded shaft 15 is rotated a predetermined number of revolutions in a predetermined direction, so that the nozzle 17 is moved as much as a distance corresponding to one pin in the return direction, so that the wire 20 guided thereby is laid over the first wire bundling pin 10*g*1, and then the first directing pin 10*e*1 in the first of the N groups. The first directing pin 10*e*1 is used to direct the wire to one of the twenty-eight (28) first positioning grooves 10*n*. In this case, the wire is engaged with the first positioning groove 10*n*1 which is the first in the first group. Therefore, the rotation of the threaded shaft 15 is stopped when the nozzle has reached the position where the wire is engaged therewith. The nozzle 17 is moved back and forth according to the rotational position of the drum which is detected by rotational position detecting means (not shown), to wind the wire on the selected pin or to engage it with the selected groove.

Figure 11:
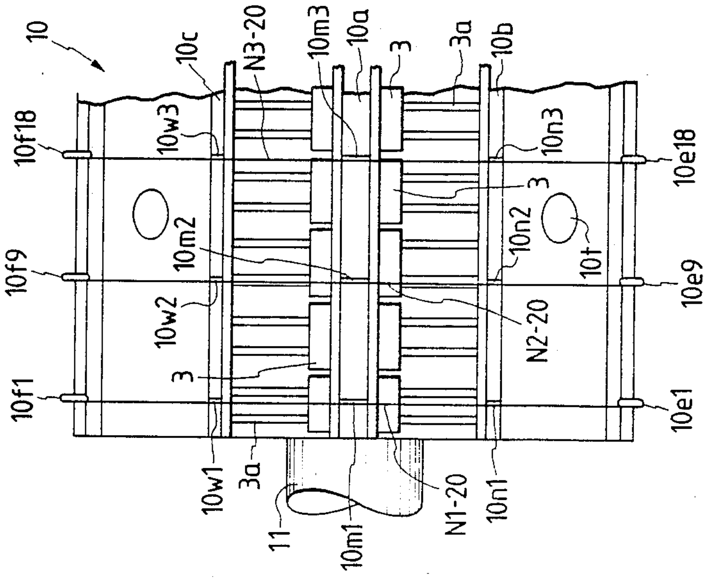
FIG. 11 is a plan view showing a part of the wire aligning drum on which electrode wires are laid.

When the nozzle 17 has been stopped, the wire 20 being guided by the nozzle 17 is engaged with the first positioning groove 10*n*1 of the rotating drum 10, and then with the first center positioning groove 10*m*1 of the first group and the second positioning groove 10*w*1. The wire 20 thus engaged with the second positioning groove 10*w*1 is guided by the nozzle 17 so that it is engaged with the second directing pins 10*f*1 of the first group and with the second wire bundling pin 10*h*1. Thus, the wire has been engaged with the first positioning groove 10*n*1, the center positioning groove 10*m*1 and the second positioning groove 10*w*1 which belong to the first of the N groups as indicated by the solid line N1-20 (cf. FIG. 2 and 11). Next, the nozzle 17 is reciprocated to pass the first second turn pin 10*j*1. More specifically, the rotation of the drum 10 is suspended, while the threaded shaft 15 is turned so that the nozzle 17 is reciprocated to pass the pin 10*j*1. After the nozzle 17 is returned in this manner, the drum 10 is turned in the reverse direction, so that the wire is wound on the second turn pin 10*j*1. Thereafter, the rotation of the drum 10 is maintained in the reverse direction until the nozzle 17 passes the first turn pin 10*i*1.

After passing the second wire bundling pin 10*h*1, the nozzle 17 is moved in the "go" direction to engage the wire 20 with the pin 10*h*1, and then moved to the position where the wire is engaged with the second directing pin 10*f*9 of the second group. Thereafter, the nozzle 17 is gradually moved to engage the wire with the first second positioning groove 10*w*2 of the second group. At this position, the movement of the nozzle 17 is suspended. The drum 10 rotating causes the wire to engage with the center positioning groove 10*m*2 and the first positioning groove 10*n*2. Thus, the wire has been laid as indicated by the solid line N2-20 (cf. FIG. 2 and 11). After passing the first positioning groove 10*n*2, the nozzle 17 is gradually moved to engage the wire with the first directing pin 10*e*9, and then moved in the "return" direction to the position where the wire is engaged with the first wire bundling pin 10*g*1. Thereafter, the nozzle 17 is maintained stopped, and when passing the first turn pin **10*i*1 the nozzle 17 is moved in the "go" direction to engage the wire with the pin 10*i*1. When the nozzle 17 has passed the pin 10*i*1, the drum 10** is stopped.

Thereafter, the drum 10 and the nozzle 17 are operated in synchronization with each other in the same manner to engage the wire with the first wire bundling pin **10*g*1, the first directing pin 10*e*18, the first positioning groove 10*n*3, the center positioning groove 10*m*3, the second positioning groove 10*w*3, the second directing pin 10*f*18, the second wire bundling pin 10*h*1, and the second turn pin 10*j*1** in the stated order.

And when finally the wire NN-20 of the N-th group is laid, it is engaged with the first directing pin **10*e*N, the first wire bundling pin 10*g*1, and the first turn pin 10*i*1. Thereafter, the nozzle 17 is moved to the position where it operates to engage the wire with the next one 10*i*2 of the M first turn pins. In FIG. 9, the nozzle is shown moved to the fourth pin 10*i*4 so that a method of laying the wire can be understood with ease. The locus of movement of the wire of the group is indicated by the one-dot chain line. If the locus from the pin 10*i*4 is indicated by using the positions of the pins and grooves; then, when the drum is rotated in the forward direction, the locus is the first wire bundling pin 10*g*4, the first directing pin 10*e*1, the fourth positioning groove from the first positioning groove 10*n*1, the fourth positioning groove from the center positioning groove 10*m*1, the fourth positioning groove from the second positioning groove 10*w*1, the second directing pin 10*f*1, the second wire bundling pin 10*h*4, and the second turn pin 10*j*4; and when the drum is rotated in the reverse direction, the locus is the second turn pin 10*j*4, the second wire bundling pin 10*h*4, the second directing pin 10*f*9, the fourth positioning groove from the second positioning groove 10*w*2, the fourth positioning groove from the center positioning groove 10*m*2, the fourth positioning groove from the first positioning groove 10*n*2, the first directing pin 10*e*9, the first wire bundling pin 10*g*4, and the first turn pin 10*i*4 (start point). Thus, the wire has been laid in the first positioning grooves 10*n*, the center positioning grooves 10*m*, and the second positioning grooves 10*w*as the one-dit chain line shown in FIG. 9. In FIG. 9, the broken lines indicate the wires which are bundled by the seventh wire bundling pins 10*g*7 and 10*i*7**.

The above-described operations are carried out M times. As a result, as shown in FIG. 5 the wires are engaged with all the center positioning grooves, first positioning grooves and second positioning grooves, respectively; that is, MxN wires are laid therein.

(Wires fixing steps)

Figure 10:
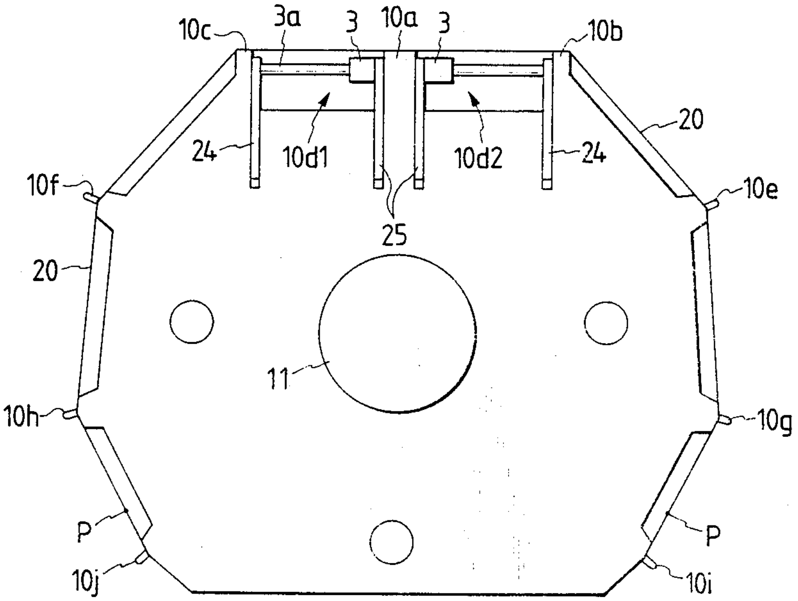
FIG. 10 is a side view of the wire aligning drum on which electrode wires are laid.

After the wires of the last group have been laid, as shown in FIG. 10 the M bundles (or groups) of wires (each bundle consisting of N wires) are fixed by applying a quick dry type adhesive to the portions P, P,... close to the first and second turn pins **10*i* and 10*j*, so that the wires of each bundle are kept combined together Thereafter, the wire pulled out of the nozzle 17** is cut off.

The center positioning grooves **10*m*, the first positioning grooves 10*n*, and the second positioning grooves 10*w*** are arranged at intervals substantially equal to the diameter of the wire, as was described before. Therefore, it goes without saying that the rotation of the drum and the movement of the nozzle can be controlled with high accuracy.

The wires engaged with the center positioning grooves **10*m* are cut later. Therefore, even if the coatings of the wires in the grooves 10*m* are removed, it will cause no trouble in use. This fact is utilized as follows: When the MxN wires have been laid, the center groove forming portion 10*a*** is rubbed with a member in the axial direction under a pressure to the extent that the wires are not broken, so that all the wires are positively fitted in the grooves.

The wire arranging step may be ended as follows: When the bundles of wires have been fixed as described above, the drum 10 is removed from the rotating device, and it is visually or optically detected whether or not the wires are satisfactorily engaged with the center positioning grooves **10*m*, the first positioning grooves 10*n*, and the second positioning grooves 10*w***. And when it is confirmed that the engagement of the wires are satisfactory, the step is ended.

(Spacer setting step)

Figure 12:
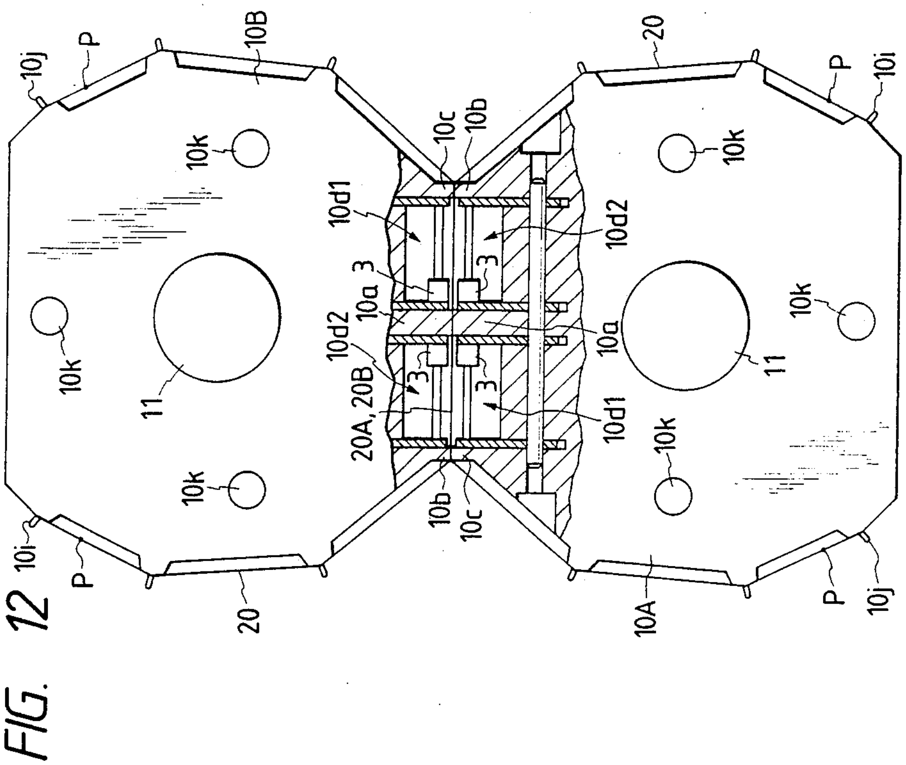
FIG. 12 is a side view, with parts cut away, showing a pair of wire aligning drums, on which electrode wires have been laid, with groove forming portions laid on each other.
Figure 13:
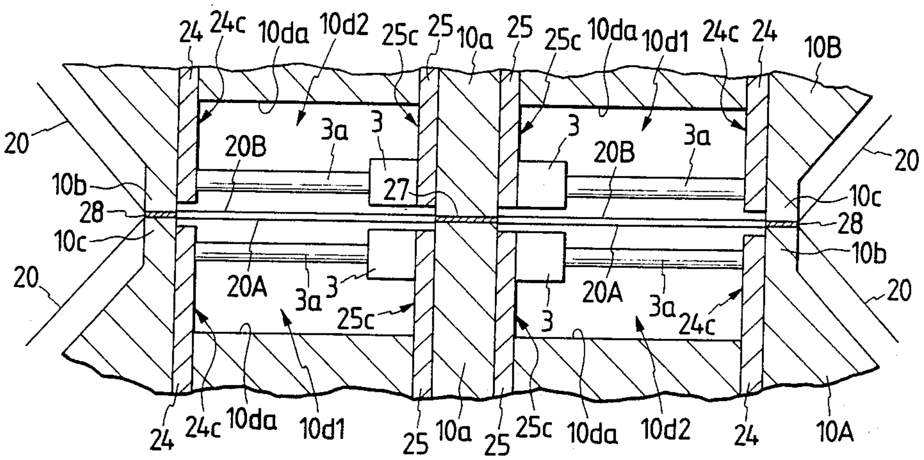
FIG. 13 is an enlarged sectional side view showing essential parts of the pair of wire aligning drums shown in FIG. 12.

Two drums 10A and 10B on which the wires 20 have been laid and bundled at the portions P as shown in FIG. 10 are set as shown in FIG. 12; that is, in such a manner that the center groove forming portion **10*a* and the first and second groove forming portions 10*b* and 10*c* of the drum 10A are confronted with those of the drum 10B. In this operation, as shown in FIGS. 13 and 14 spacers 28, 27 and 28 having a predetermined thickness are disposed between the confronted groove forming portions 10*b*, 10*a* and 10*c*, thus providing a predetermined distance G between the recording electrodes. As was described before, the aligned wires are engaged with the grooves of the groove forming portions 10*a*, 10*b* and 10*c*. Therefore, before fixed, the drums are so positioned that, as shown in FIG. 14, the wires 20A forming the first recording electrode array A (FIG. 1) and the wires 20B forming the second recoding electrode array 2B (FIG. 1) are shifted from each other as much as the pitch equal to the wire diameter along the drum axis; that is, the aligned wires 20A and 20B are positioned staggered. After the wires are shifted and the spacers are disposed, the two drums 10A and 10B are fixedly secured to each other as follows: Members which forms part of the mold closing the ends of electrode holding recesses 10*d*1 and 10*d*2 are closely fitted to the right and left ends of the drums, and under this condition fixing screws (not shown) are engaged with threaded holes 10*k*. A parting agent is applied to the inner surfaces of the members forming part of the mold. One of the members has a hole through which insulating resin is injected into the mold. With the spacers disposed as shown in FIG. 13, the wires 20A and 20B are laid in the electrode holding recesses 10*d*1 and 10*d*2** at predetermined intervals.

(Resin injecting step)

Figure 15:
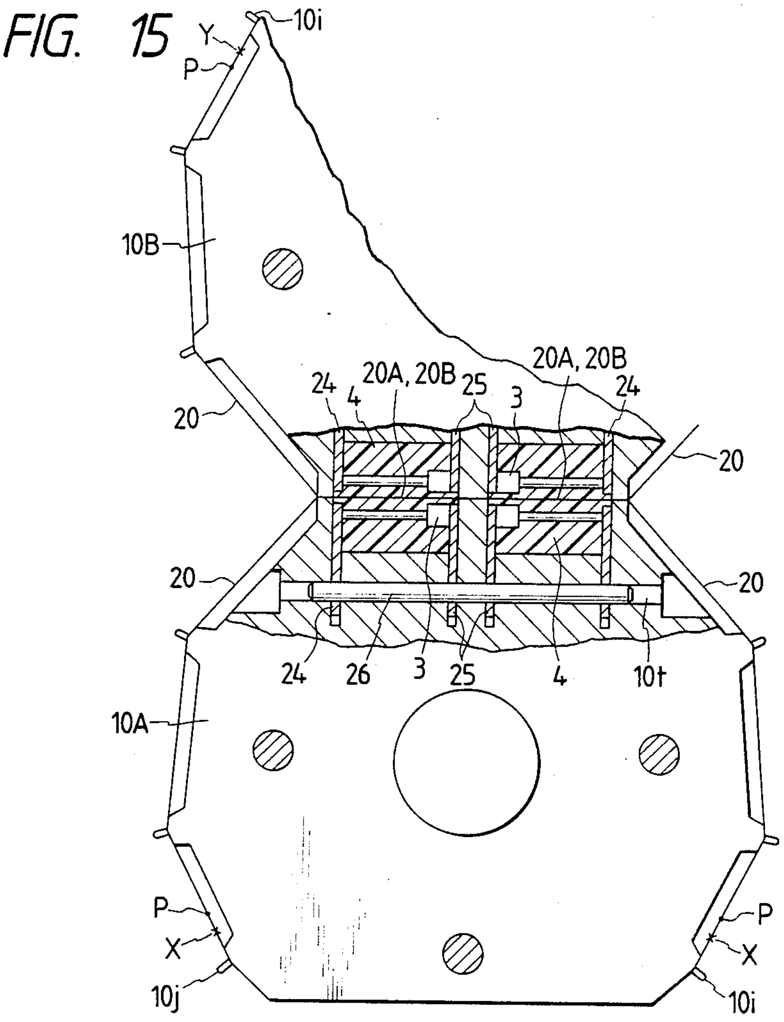
FIG. 15 is a side view, with parts cut away, showing the pair of wire aligning drums into the control electrode holding recesses of which insulating resin has been injected.

As shown in FIG. 15, molten insulating resin is injected into the electrode holding recesses **10*d*1 and 10*d*2 of the two drums 10A and 10B joined together, in such a manner as to surround the wires and the control electrodes thereby to form the electrode supports 4. It goes without saying that the injection of the resin is carried out in such a manner that the arrangement of the wires 20A and 20B** laid in parallel is maintained unchanged.

(Connecting step)

Figure 16:
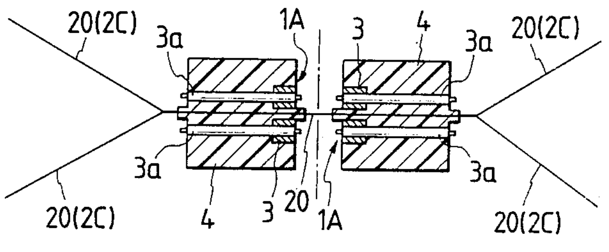
FIG. 16 is a sectional view showing head elements removed from wire aligning drums.

After the insulating resin forming the electrode supports 4 has been set, the wires 20A of the drum 10A are cut at the positions X between the fixed portions P and the pins 10*i*, and at the points X between the fixed portions P and the pin 10*j*. Under this condition, the wires are removed from both sides of the drum. Next, the plate supporting pins 26 is removed from the holes 10*t*, and the drum 10A is moved downwardly so that the head element molded with the resin and the electrode supporting plates 24 and 25 are removed from the electrode holding recesses 10*d*1 and 10*d*2. Next, the wires 20 laid on the drum 10B are cut at the points Y between the fixed portions P and the pins 10*i* and at the points Y between the fixed portions P and the pin 10*j* (not shown in FIG. 15). Then, the plate supporting pins (not shown) are removed from the drum, and the head element is removed from the drum 10B. The head elements without the electrode supporting plates 24 and 25 are as shown in FIG. 16. The head elements are divided into two parts by cutting along the one-dot chain line the wires 20 engaged in the positioning grooves of the center groove forming portions 10*a* and 10*a*. Thus, two head elements are obtained, and secured to a plate-shaped head supporting member. The (M×2) bundles of wires 20 (each bundle consisting of N wires 20) are electrically connected, as the lead wires 2C shown in FIG. 1, to (M×2) terminals 5*a*, 5*b*, 5*c*..... and 5*n* of the wiring terminal board, respectively. The electrode supporting pins 3*a* of the control electrodes 3 are connected to control electrode terminals (not shown). After the connection of the lead wires has been accomplished, the lead wires are put in a frame (not shown) for protection.

(Grinding Step)

Figure 17:
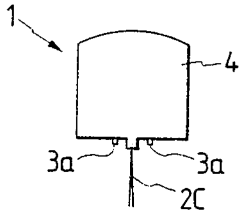
FIG. 17 is a side view of the head element whose head surface has been ground.

The head elements thus connected are machined as follows: That is, the head surfaces lA and lA (cf. FIG. 16) are ground partially cylindrical as shown in FIG. 1 or 17. According to the embodiment, two head elements are obtained at the same time.

Through the above-described manufacturing steps, the end faces of the MxN electrodes of the first recording electrode array 2A and of the MxN electrodes of the second recording electrode array 2B, and the end faces of the electrodes of the control electrode arrays 3A and 3B arranged on both sides of those recording electrode arrays 2A and 2B are exposed in the head surface.

Now, one example of a method of aligning wires while a wire aligning drum is rotated in one direction only will be described with reference to FIGS. 18 and 19.

The specific feature of the drum 10C resides in that the first wire bundling pins 10*i* and the second wire bundling pins 10*j* are used as wire bundling means instead of the above-described turn pins, and recesses 10*y* and 10*y* are formed between these pins, thus providing a protrusion 10*z* between the recesses which is elongated along the axis of the drum 10 to prevent the unwanted vibration of the wires. A locking part 10*x* for locking the end 20*a* of the wire pulled out is provided upstream of the protrusion 10*z* in the direction of rotation b of the drum. The first and second wire bundling pins 10*i* and 10*j* may be replaced by M number of bundling grooves which are deep enough to receive N number of wire. The drum 10C is rotated in the direction of the arrow b by the control means 23 (cf. FIG. 2). The nozzle 17 (cf. FIG. 2) is reciprocated along the axis of the drum supporting shaft. In this operation, the direction and distance of movement of the nozzle 17 are controlled by the control means 23 in association with rotation of the drum 10C. Similarly as in the above-described embodiment, the first groove forming portion 10*b*, the center groove forming portion 10*a*, and the second groove forming portion 10*c* have MxN first positioning grooves 10*n*, MxN center positioning grooves 10*m*, and MxN second positioning grooves 10*w*, respectively. Before a wire aligning step is started, the end 20*a* of the wire 20 is connected to the locking part 10*x* as shown in FIG. 18. As the drum rotates, the nozzle 17 is moved to engage the wire with the first bundling pins 10*i*1 and 10*g*1 and with the first directing pin 10*e*1. Thereafter, in order to engage the wire 20 with the first positioning groove 10*n*1 of the first groove forming portion 10*b*, the nozzle 17 is gradually moved to determine the direction of the wire 20. When the direction of the wire 20 has been determined, the nozzle 17 is stopped. When the nozzle 17 is stopped in this manner, the wire 20 is engaged with the first positioning groove 10*n*1, the center positioning groove 10*m*1, and the second positioning groove 10*w*1 (cf. FIG. 3), so that the wire is laid in the electrode holding recesses 10*d*2 and 10*d*1. The wire engaged with the second positioning groove 10*w*1 is guided by the nozzle 17 so as to engage with the second directing pin 10*f*, the second bundling pins 10*h* and 10*jh* and the first bundling pins 10*i*1 and 10*g*1. Thus, the wire has been laid in the first positioning grooves of the first group as indicated at N1-20 in FIG. 19.

After passing the first bundling pin 10*g*1, the wire is guided by the nozzle 17 so as to engage with the first directing pin 10*en* of the next one of the N-th group. The wire, being directed by the first directing pin 10*en*, is engaged with the first positioning groove 10*mn*, and the following center positioning groove and second positioning groove, and returned to engage with the pins 10*fn*, 10*jn* and 10*i*1. Thus, the n-th wires of the N groups are laid as indicated at Nn-20 in FIG. 19. After N wires have been engaged with the first bundling pins 10*i*1 and 10*g*1, the wire is engaged with the N-th second bundling pin 10*j* belonging to the first group, and then it is guided by the nozzle 17 so as to be engaged with the second bundling pins 10*i*2 of the M groups. In order to clearly show the positions of the wires, in FIG. 19 the wire is engaged with the fourth first bundling pins 10*i*4 of the M groups, and it is laid on the drum starting from the pin 10*i*4 as indicated by the broken lines. While N wires are engaged with all the bundling pins (M number of bundling pins), the drum 10C is kept turned in one direction b. When the wires have been engaged with all the positioning grooves and all the bundling pins, the drum 10C is stopped, and the bundles of wires are fixed at the bundling points P. Thereafter, a mold is formed by placing another drum or a member forming a part of the mold on the electrode holding recesses 10*d*1 and 10*d*2, and insulating resins is injected into the mold to form electrode supporting members therein. After the resin thus injected has been set, the bundles of wires are cut at the points X and X, or at the point Y and removed from the drum, to provide a head element. In order to prevent the difficulty that the wires become loose, the bundles of wires should be cut at points closer the fixing points P.

Figure 18:
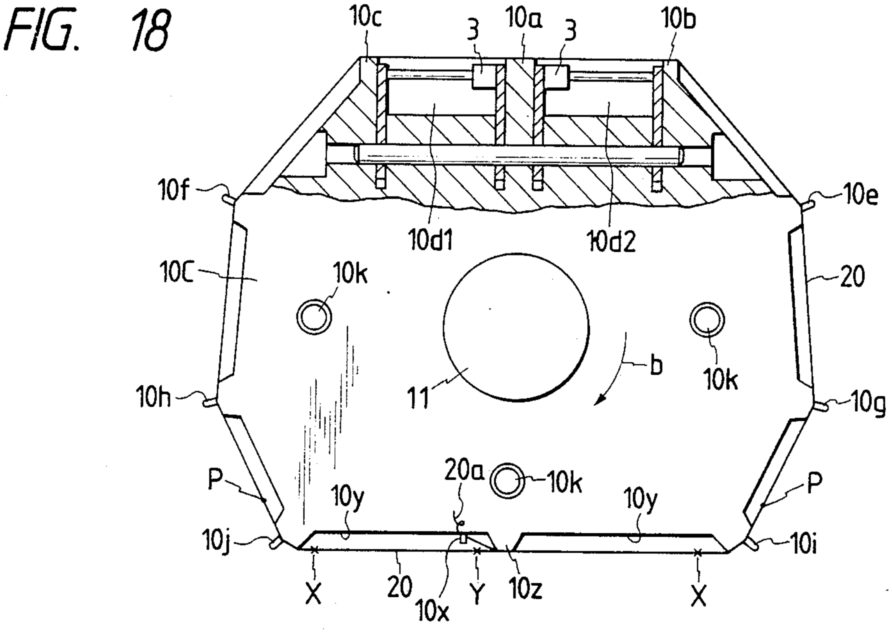
FIGS. 18 and 19 are a side view and a plan view with part cut away, showing a wire aligning drum which is suitable for practicing a method of manufacturing a multi-stylus recording head by turning a wire aligning drum in one direction only, respectively.
Figure 19:
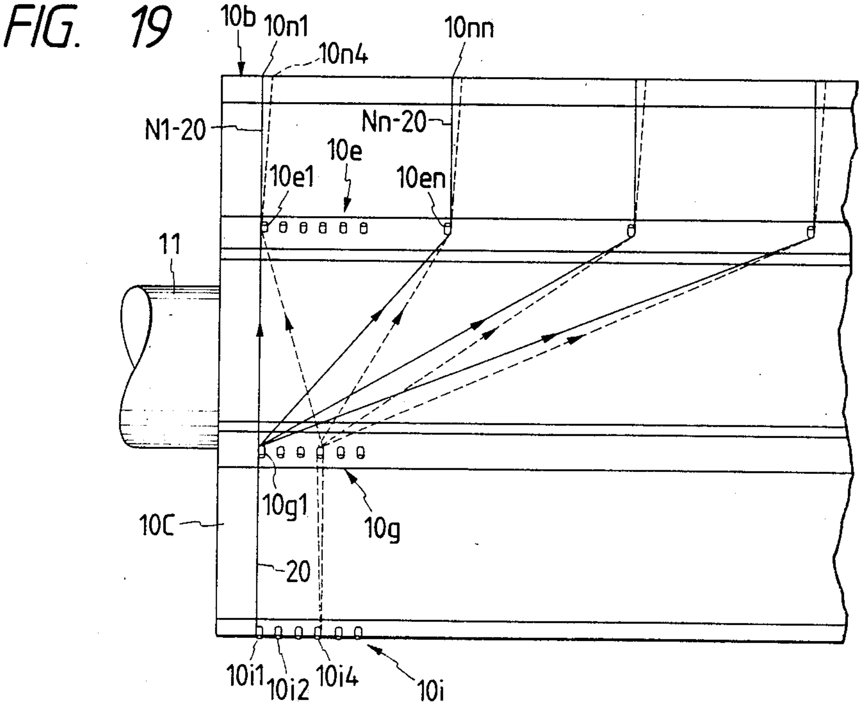

The drums 10 and 10C shown in FIGS. 2 and 18, the center groove forming portion 10*a* is provided between the first and second groove forming portions 10*b* and 10*c*, and the control electrodes 3 are held in the electrode holding recesses 10*d*1 and 10*d*2, so that two head elements with the control electrodes are formed. This method can be applied to manufacture of a multi- stylus head having no control electrode. That is, the multi-stylus head can be formed by performing the resin injecting operation without provision of the control electrodes. In the drum, the center groove forming portion 10_a_ may be eliminated so that the electrode holding recesses 10_d_1 and 10_d_2 are combined into one electrode holding recess. In this case, the head elements are formed one at a time.

Figure 20:
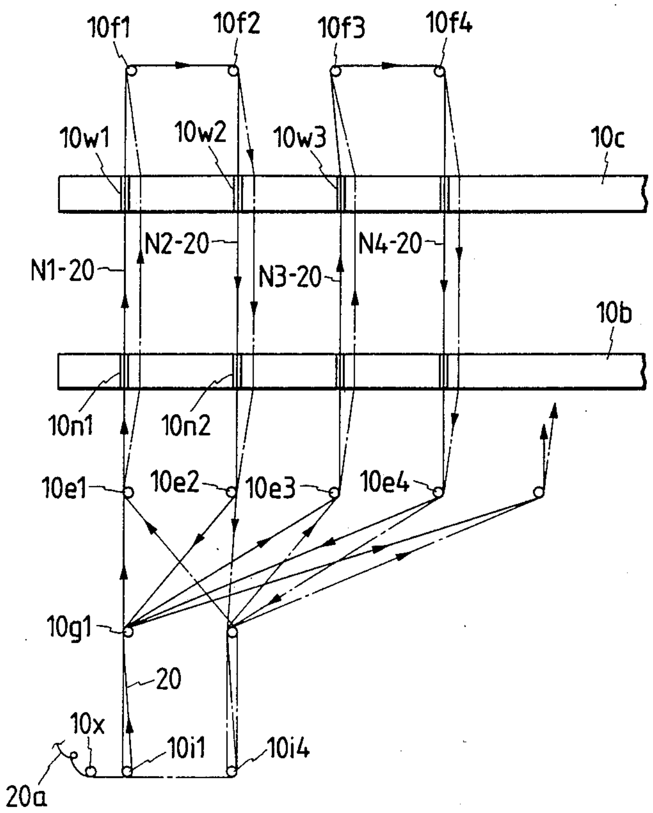
FIG. 20 is an unfolded diagram showing a wire aligning drum employed in a method of aligning wires by turning a wire aligning drum in forward and reverse directions.

One example of a wire aligning step will be described with reference to FIG. 20 in which the drum is turned in the forward and reverse directions, while the nozzle is moved relative to the drum. .

The end 20_a_ of the wire 20 is connected to a locking pin 10_x_. Then, the wire 20 is engaged with the first bundling pines 10_i_1 and 10_g_1, and the first directing pin 10_e_1, where it is directed, so that it is engaged with the first positioning groove 10_n_1 and the second positioning groove 10_w_1 as indicated at N1- 20. When the wire passes the second directing pin 10_f_1, the forward rotation of the drum is suspended, and the nozzle is moved in the "go" direction to the position where the wire is engaged with the second directing pin 10_f_2 of the second of the N groups. When the drum is turned in the reverse direction and the nozzle determines the direction of the wire, then this wire is engaged with the second positioning groove 10_w_2 and the second positioning groove 10_n_2 of the second of the N groups as indicated at N2-20 in FIG. 20. The wire engaged with the first positioning groove 10_n_2 is then guided by the nozzle so that it is engaged with the first directing pin 10_e_1 of the second of the N groups, and the first bundling pin 10_g_1 and 10_i_1. The above- described operations are repeatedly carried out. In FIG. 10, the wires bundled at the first one 10_i_4 are indicated by the one-dot chain lines. In this embodiment, the second directing pins 10_f_ serve also as turn pins, and the structure of the wire laying drum is simplified as much.

As was described above, in the multi-stylus manufacturing method of the invention, the electrodes are separated into groups and bundled while one electrode wire is being supplied to the drum, and therefore the electrode wire can be supplied at higher speed. Furthermore, in the method, only one wire is supplied to the drum, and therefore the wire can be maintained suitably tensioned with ease, and the recording head can be manufactured with higher efficiency.

Moreover, with the manufacturing apparatus according to the invention, one electrode wire is repeatedly laid on the drum to form bundles of electrode wires. Therefore, the manufacturing apparatus is simpler in construction.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

In these embodiments described above, the wire aligning step is performed in order of a first groove, a second groove, a third groove,.... However, the order to align wires may be appropriately set under the conditions that wires are finally positioned in predetermined grooves and a predetermined number of wires are finally bundled in wire bundling sections

What is claimed is:

1. A method of manufacturing a multi-stylus recording head in the head surface of which the ends of MxN recording electrodes are exposed where N is the number of groups of said recording electrodes, and M is the number of said recording electrodes which are arranged with a predetermined pitch in each of said N groups, in which a multi-stylus recording head manufacturing apparatus is used which comprises:

a wire aligning member including

MxN first positioning grooves extended in a predetermined direction for engaging with an electrode wire, MxN second positioning grooves formed in correspondence to said first positioning grooves with the same pitch for engaging with said electrode wire, a first wire directing section for directing said wire which is to be engaged with said first positioning grooves, a second wire directing section for directing said wire which is to be engaged with said second positioning grooves, M first wire bundling sections for bundling, of the wires of said N groups engaged with said first positioning grooves, N wires at predetermined positions in said N groups, and M second wire bundling section for bundling, of the wires of said N groups engaged with said second positioning grooves, N wires which are the same in positional relation as those in said first wire bundling sections; and wire supplying means for supplying said wire to said wire aligning member, to lay said wire pulled out of said wire supplying means to align MxN wire according to the following manufacturing steps:

(a) said wire is engaged with the m-th of said first wire bundling sections (m=1, 2,......) and then with said first directing section corresponding to the n-th of said N groups (n=1, 2,....), (b) in said n-th group having M grooves, said wire is engaged with said first and second positioning grooves which are in predetermined positional relation to said m-th wire bundling section, (c) said wire is engaged with said second directing section corresponding to said n-th group, with the m-th of said second wire bundling sections, and then with said second directing section corresponding to the n'-th of said N groups which is different from said n-th;

(d) in said n'-th group having M grooves, said wire is engaged with said first and second positioning grooves which are in predetermined positional relation to said m-th wire bundling section, (e) said wire is engaged with said first directing section corresponding to said n'-th of said N groups, and then with the m-th of said first wire bundling sections and (f) manufacturing steps (a) through (e) are repeatedly carried out, or said manufacturing steps are repeatedly carried out with said wire engaged with the m,-th wire bundling section different from said m-th wire bundling section, so that one wire is engaged with each of said first and second positioning grooves, and N wires are bundled at each of said M first wire bundling sections and M second wire bundling sections.

2. A method of manufacturing a multi-stylus recording head in the head surface of which the ends of MxN recording electrodes are exposed where N is the number of groups of said recording electrodes, and M is the number of said recording electrodes which are arranged with a predetermined pitch in each of said N groups, in which a multi-stylus recording head manufacturing apparatus is used which comprises:

a wire aligning member including

MxN first positioning grooves formed in the surface of a rotary drum in such a manner as to extend in the direction of axis of said drum to engage part of an electrode wire, MxN second positioning grooves formed in the surface of said rotary drum in the same direction and with the same pitch as said first positioning grooves, a first wire directing section for directing said wire which is to be engaged with said first positioning grooves, a second wire directing section for directing said wire which is to be engaged with said second positioning grooves, M first wire bundling sections for bundling N wires which are engaged with said first positioning grooves which are corresponding in position to one another in said N groups, and M second wire bundling sections for bundling N wires which are engaged with said second positioning grooves which are corresponding in position to one another in said N groups; and wire supplying means for supplying said wire to said wire aligning member, to lay said wire pulled out of said wire supplying means as follows:

(a) said wire is engaged with the m-th of said first wire bundling sections (m=1, 2,......) and then with said first directing section corresponding to the n-th of said N groups (n=1, 2,....), (b) in said n-th group having M grooves, said wire is engaged with said first and second positioning grooves which correspond to said m-th bundling section, (c) said wire is engaged with said second directing section corresponding to said n-th group, and with the m-th of said second wire bundling sections, (d) said wire thus engaged is engaged with said first wire bundling section, and the above-described manufacturing steps are repeatedly carried out, and at the m-th (m=1, 2,....) of each of said first and second wire bundling sections, N wires corresponding to the m-th of the M wires of each group are bundled.

3. A method of manufacturing a multi-stylus recording head in the head surface of which the ends of MxN recording electrodes are exposed where N is the number of groups of said recording electrodes, and M is the number of said recording electrodes which are arranged with a predetermined pitch in each of said N groups, in which a multi-stylus recording head manufacturing apparatus is used which comprises:

a wire aligning member including

MxN first positioning grooves extended in a predetermined direction for engaging with part of an electrode wire, MxN second positioning grooves formed in the same direction and with the same pitch as said first positioning grooves, a first wire directing section for directing said wire which is to be engaged with said first positioning grooves, a second wire directing section for directing said wire which is to be engaged with said second positioning grooves, and M first wire bundling sections for bundling N wires at predetermined positions in said N groups; and wire supplying means for supplying said wire to said wire aligning member, to lay said wire pulled out of said wire supplying means to align MxN wires according to the following manufacturing steps:

(a) said wire is engaged with the m-th of said first wire bundling sections (m=1, 2,......) and then with said first directing section corresponding to the n-th of said N groups (n=1, 2,....), (b) in said n-th group having M grooves, said wire is engaged with said first and second positioning grooves which are in predetermined positional relation to said m-th wire bundling section, (c) said wire is engaged with said second directing section corresponding to said n-th group, and then with said second directing section corresponding to the n'-th of said N groups which is different from said n-th group;

(d) in said n'-th group having M grooves, said wire is engaged with said first and second positioning grooves which are in predetermined positional relation to said m-th wire bundling section, (e) said wire is engaged with said first directing section corresponding to said n'-th of said N groups, and then the m-th of said first wire bundling sections, and (f) manufacturing steps (a) through (e) are repeatedly carried out, or manufacturing steps (a) through (e) are repeatedly carried out with said wire engaged with the m'-th wire bundling section different from said m-th wire bundling section, so that N wires are bundled at each of said M first wire bundling sections.

4. An apparatus for manufacturing a multi-stylus recording head in the head surface of which the ends of MxN recording electrodes are exposed where N is the number of groups of said recording electrodes, and M is the number of said recording electrodes which are arranged with a predetermined pitch in each of said N groups, which comprises:

a wire aligning member including

MxN positioning grooves extended in a predetermined direction for engaging with an electrode wire, a wire directing section for directing said wire which is to be engaged with said positioning grooves and M wire bundling sections for bundling N wires engaged with the corresponding positioning grooves of said N groups;

wire-aligning-member drive means for moving said wire aligning member;

wire supplying means for supplying one wire continuously;

wire guide means for continuously engaging said wire pulled out of said wire supplying means with said positioning groove, directing section and wire bundling section of said wire aligning member;

a wire guide drive means for moving said wire guide; wire to said wire aligning member; and control means which controls movement of said wire aligning member through said wire-aligning-member drive means and movement of said wire guide means through said wire guide drive means, to move said wire aligning member and said wire guide means relative to each other, to thereby engage said one wire pulled out of said wire supplying means with said wire bundling section, wire directing section and positioning grooves continuously, so that, of the M wires of each of the N groups, N wires being in a predetermined positional relation to one another are bundled at the m-th of said M wire bundling sections, and M×N wires are aligned in said positioning grooves.

5. An apparatus for manufacturing a multi-stylus recording head in the head surface of which the ends of recording electrodes arranged with a predetermined pitch are exposed comprising:

a wire aligning member including two positioning groove arrays (10*n* and 10*w*) extended in a predetermined direction for engaging with part of an electrode wire, a wire directing section for directing said wire which is to be engaged with said positioning grooves, a wire bundling section for bundling said wires engaged with said positioning grooves every a predetermined number of wires, and a control electrode holding recess provided between said two positioning grooves (10*n* and 10*w*), said recess forming a part of a control electrode casting mold;

wire-aligning-member drive means for moving said wire aligning member;

wire supplying means for supplying one wire continuously;

wire guide means for continuously engaging said wire pulled out of said wire supplying means with said positioning groove, directing section and wire bundling section of said wire aligning member;

a wire guide drive means for moving said wire guide means;

control means which controls movement of said wire aligning member through said wire-aligning-member drive means and movement of said wire guide through said wire guide drive means, to move said wire aligning member and said wire guide member relative to each other, thereby to engage said one wire pulled out of said wire supplying means with said wire bundling section, wire directing section and positioning grooves continuously; and electrode fixing means for pouring an insulating resin into a space defined by said control electrode holding recess and said electrode casting mold combined therewith, to fixedly hold said electrode wires and control electrodes simultaneously.

* * * * *